United States Patent Office 3,533,313
Patented Oct. 13, 1970

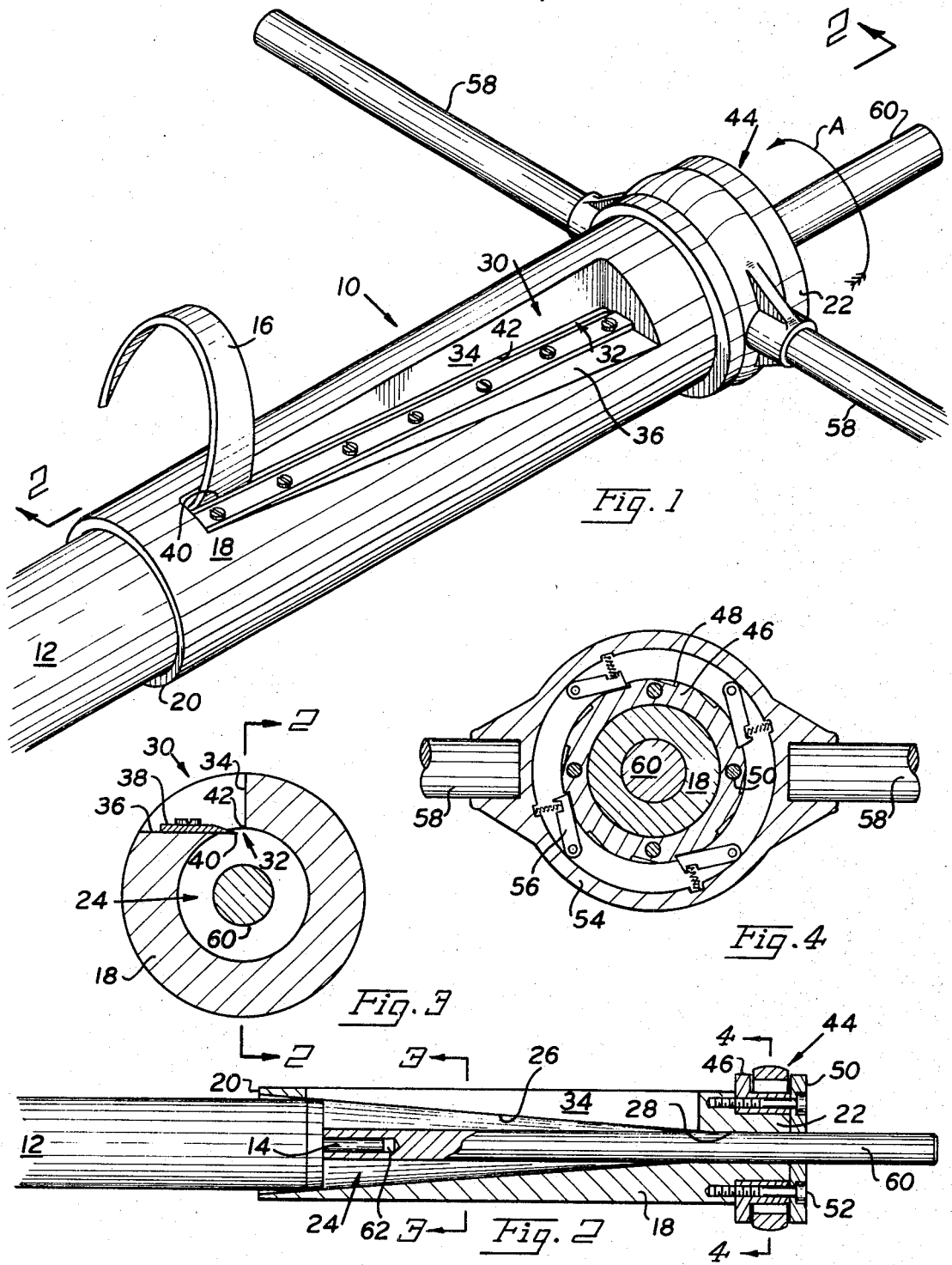

3,533,313
TOOL FOR STRIPPING INSULATION
James J. Matthews, Hicksville, N.Y.
(Landing Hill Road, East Haddam, Conn., 06438)
Filed Feb. 2, 1968, Ser. No. 702,641
Int. Cl. H02g 1/12
U.S. Cl. 81—9.5          9 Claims

ABSTRACT OF THE DISCLOSURE

A tool for stripping insulation from the end of an electrical conductor having a frustroconical bore, a longitudinal slot formed therein, cutting means mounted in the slot for cutting the insulation and means for guiding the conductor through the bore.

---

The present invention relates to a tool for stripping insulation from the end of electrical conductors and, in particular, to a tool for removing the insulation from the end of a high voltage cable so that the cable insulation is left with a conically formed terminus.

High voltage cables of single strand or multi-strand conductive wire are generally covered by a thick layer or cover of rubber or a plastic such as polyvinyl chloride or polyethylene. An inner shield of semi-conductive material may sometime be employed between the thick outer layer and the cable. Because of the thickness of the core wire such cables are spliced by a technique known as "butt splicing." This technique involves the conical or bevel denuding of only a small portion of the cable end and abutting this portion end-to-end with a similarly denuded cable. The cables are joined and then successively wrapped with the shielding material and/or the insulating material until the conical portions are filled to the thickness of the original cable.

It is important that the insulation be removed from the cable with as perfect, or near perfect, conical or bevelled end as is possible, since both the dielectric value and mechanical strength of the splice is dependent on the uniformity of wrapping permitted thereby.

It is also important that nicking or cutting of the wire is avoided when stripping the cable since the splice can be weakened therefrom.

Various attempts have been made to provide stripping tools for conically removing insulation from the type of cable described, however, none has been entirely successful in making perfect bevels. Briefly, such devices comprise a body having an internal frustro-conical bore provided with a longitudinal aperture into which is secured a cutting blade. By rotation of the body, the cutting blade continuously removes a thin section of the insulation layer conically about the end of the cable very much in the fashion of a pencil sharpener.

An important area in which the prior devices have failed has been in their inability to stabilize the tool against the backlash or counter force of the insulation against the blade. Because of this, the tool tends to waiver and vary in cutting so that an imperfect bevel is made.

Another area, perhaps equally, if not more critical, is the lack of stability of the cable at its extreme forward end since, notwithstanding its bulk and thickness, such cable is nevertheless unlike pencils. Wire cables are flexible and their ends cannot be freely inserted into a tool to assume a proper position for the initial cutting. Further, cables are not perfectly uniform and symmetrical and the core is most often not perfectly coaxial within the insulation layer.

Accordingly, the prior art devices, all of which relied solely upon the insulation's circumference for stability and guidance of the cable within the tool, were unable to provide perfect bevels.

It is the prime object of the present invention to provide a stripping tool for removing insulation from cable or the like in a perfect bevel.

It is an object of this invention, also, to provide a simple tool, one easy to use for the described purpose.

It is a general object of this invention to overcome the defects of the prior art and to make a better tool for the purpose described.

It is a specific object of this invention to provide a tool which eliminates the "backlash" problem described.

It is another specific object of this invention to provide a tool which eliminates the problem of the initial stripping and which provides means for continually guiding the cable through the device.

Numerous other objects and advantages of the present invention will reveal themselves from the structure and arrangements more fully described hereinafter in which reference is made to the accompanying drawing in which:

FIG. 1 is a perspective view of a device constructed in accordance with the present invention, positioned about a cable having removed therefrom a portion of its insulation;

FIG. 2 is a sectional view of the device taken along line 2—2 of FIG. 1;

FIG. 3 is a sectional view of the device taken along line 3—3 of FIG. 2, and;

FIG. 4 is a sectional view of the device taken along line 4—4 of FIG. 2.

Referring to FIG. 1, the device of the present invention is generally identified by the numeral 10 and is shown positioned about a terminal section of a cable 12 having an inner wire core 14 (FIG. 2) from which a portion of insulation 16 has been stripped.

The device 10, seen also in FIGS. 2 and 3, comprises a generally cylindrical body 18 having a rear end 20 and a forward end 22. Running axially through the body 18 is a bore generally designated 24. The bore 24 is formed with a right or perpendicular frustro-conical section 26 extending from the rear edge 20 inwardly to a point approximately three-fourths of the length of the body and a cylindrical portion 28 extending from that point or vertex to the forward edge 22 of the body. The cylindrical portion being substantially of the same diameter as the smallest diameter of said conical portion.

A longitudinal sector, generally designated 30, is cut out of the midsection of the body 16 to provide an elongated slot 32 opening into the conical portion 26 of the bore 24. The sector 30 is defined by cutting a wall 34 substantially along a diametral plane and then by cutting a second wall 36 along a chordal plane perpendicular thereto and parallel to a plane tangent to the conical bore portion 26 so that it inclines downwardly from rear to front with respect to the surface of the body 18 and substantially parallel to the bore 26 in the direction of movement of the cable 12.

A cutting blade 38 is securely mounted along the entire length of inclined wall 36 so that its cutting edge 40 extends through the slot 32 into the conical bore portion 26. The blade 38 is mounted, so that its cutting edge 40 is parallel to, but spaced from, the plane of the wall 34. Wall 36 is cut in depth with respect to the inner corner 42 of the diametral wall 34 by an amount approximately that of the desired thickness of the insulation to be removed. Thus corner 42 cooperates with the cutting edge 40 in the stripping of the insulation by contact with the opposed outer surface of the insulation to produce a knife and ledger action, the results of which are more fully described later.

At the forward end 22 of the body 18, there is provided a ratchet-type turning mechanism generally designated 44. The turning mechanism 44 comprises a collar 46 fitted over the end 22 which is reduced in diameter to accommodate the collar. The collar 46 is povided with a plurality of ratchet teeth 48 and is securely fixed to the body 18 by a cover plate 50 and a plurality of bolts 52 extending into the body 18. Coaxially spaced about the collar 46 and rotatable relative thereto is a wheel-like member 54 having secured within a plurality of spring loaded ratchet pawls 56 adapted to engage the ratchet teeth 48 on rotation in one direction only. Secured to the outside of the wheel member 54 is a pair of opposed handles 58 by which the mechanism 44 may be manually manipulated. The ratchet mechanism 44 is conventional in design and when organized in the well known manner will permit rotation of the stripping device 10 in the direction of arrow A (FIG. 1) with very little effort on the part of the operator.

The device 10 is equipped with the provision of a guide bar or rod 60 which enables it to avoid and overcome off-axis or non-concentric removal of insulation from the cable, one of the major defects of the prior art devices. The guide rod 60 may be a generally rigid solid cylindrical rod adapted to be slidingly inserted and snugly guided in the bore 24. The rod 60 moves slidingly in the bore 24, concentric and coaxially with the cylindrical bore section 28 of the device 10. At the internal end of the guide rod 60, there is a small coaxial guide recess 62, facing in the direction of the interior of the device 10. The recess 62 is of such size, shape and dimension as to guidingly receive within it the forward end of the wire 14 of the cable 12.

In operation, a short length of the end of the cable 12 is removed of its insulation, either manually or by some other means, so that a short length of the inner core wire 14 is exposed. The guide rod 60 is inserted through the right hand end of the bore 24 as seen in FIG. 2, and then moved rearward or to the left from the bore 28 toward the exposed wire 14 to enable the same to be guidingly received and mounted within the recess 62. The cable end 14 is then pushed forward so that it is inserted through the end 20 of the body 18. This forward movement is continued until the forward end of the insulation 16 abuts into contact with the conical bore portion 24 (FIG. 2) and consequently with the cutting edge 40 of the blade 38.

All during the forward movement of the cable 12 into the body of the device 10, the end of the cable 12 is concentrically guided in the device 10 by the recesses 62 of the rod 60, that is coaxially guided in the bore 28. During the forward movement of the cable 12, the rod 60 moves a corresponding distance to the right and outward from the end of the device 10 at the bore 28. The device 10 is then rotated in the direction of the arrow A and moved relative to the cable. Consequently, insulation is progressively removed or stripped from the cable, as indicated in FIG. 1 of the drawing in the same manner as a pencil is sharpened.

During this insulation stripping or removal operation, the device 10 moves progressively to the left along or relative to the cable 12 with a consequent forward movement or displacement of the guide rod 60 projecting outward beyond the right hand end of the device 10 as shown in FIG. 2. Sufficient insulation is removed from the cable when the device 10 and the cable 12 have moved relative to each other, such that the knife or cutting blade 38 removes the insulation down to the diameter of the guide rod 60. Thus, during the removal of insulation, the guide rod 60 constantly supports the end of the cable and assures that the cable remains concentric with the interior of the device 10.

Insulation may be removed to any desired length from the cable 12 since the smallest diameter of reduction of the cable by the device can be equal to no less than the diameter of the guiding rod 60. Hence, the cable 12 will constantly abut the rod 60, moving it forward and out of the device, as the device 10 and the cabe 12 move progressively relative to each other with the resultant diameter of the cable 12 being able to be accomodated within the bore 28 if more insulation is removed than is desired.

It will be appreciated that the rigid guide rod 60 accurately and securely guides the cable 12 perfectly coaxially through the bore 24 and toward the bore 28. By the cooperation thus provided the guide rod 60 makes the forward end of the cable 12 and 14 rigid with it. Since the guide rod 60 is snugly guided in the bore 28, the cable will not move in any manner other than coaxially with the bores 24 and 28. Thus, by a simple yet inexpensive structure, a coaxial removal of insulation from all cables treated by the present invention is assured.

It can now be observed that the provision of a narrow slot 32, defined by walls 34 and 36 (further narrowed by the placement of the blade 38 therein) overcomes the backlash problem known in the prior art. By making the slot 32 large enough only for the thickness of the slice of insulation 16 being removed, and locating the wall 34 substantialy perpendicular thereto, all the backlash forces are absorbed by the device so that none react against the cutting blade 38. In the known prior art devices, the opening for the stripped insulation was always large, being formed by cutting the body completely across or transverse thereof thereby opening the body wide and giving no support for the knife edge or the removed portion of insulation.

Further, the narrow slot 32 tends to curl the removed insulation, as seen in FIG. 1, in a direction opposite to the curl or material curvature of the insulation before stripping, thus facilitating the stripping by turning the cut piece upwardly over the cutting edge and away from any interference with the cutting blade 38. The prior art devices with their large openings did not change the curve of the insulation and consequently the removed strip tended to continuously interfere with a sustained cutting operation. Of course, the position of the blade 38 may be adjusted to conform to the thickness of the insulation to be removed, however, it would be preferable to remove as thin a strip of insulation as is convenient since greater accuracy is thereby maintained.

It is thus seen that the present invention has provided a novel device which is simple in construction and operation. Because of the elimination of backlash and the provision of the guide means 60, a perfect co-axial bevelled end is obtainable on all cables. It is clear that various modifications may be made to the details of the described structure without departing from the essential elements of the novel concepts disclosed. For example, the length of the frustro-conical bore position 26 may be varied as desired to produce a bevel of desired slant. The longer the portion 26, the shallower the slant, etc. Likewise, the cylindrical bore portion 28 may also be varied provided the same is maintained long enough to give sufficient support for the guide rod 60 and/or cable 12, as described.

It will be observed that the cylindrical bore portion 28 is larger in diameter than the inner wire and consequently the slope of the blade 38 ends just short of the diameter of the inner wire 14. Thus, all the desired insulation is removed from the stripped cable 12, while nicking or cutting of the inner wire 14 is avoided.

Modification of the ratchet-type mechanism 44 may also be made. This mechanism may be omitted entirely and replaced with other means, such as a simple wrench, for rotating the body.

Since it is understood that various omissions, substitutions and changes may be made in the form and details of the device illustrated without departing from the spirit of the present invention, it is the intention therefore that this invention be limited only as indicated by the scope of the clams appended hereto.

What is claimed is:

1. A tool for removing insulation from an electrical conductor comprising a body having a frustro-conical bore extending therein, said body having a longitudinal opening into said conical bore formed by cutting away a sector of said body defined by a diametral wall and a chordal wall perpendicular thereto and parallel to a plane tangent to said conical bore, cutting means mounted on said chordal wall having a cutting edge parallel to said diametral wall and spaced therefrom whereby upon rotation of said tool insulation is removed from said conductor between said cutting edge and said diametral wall, an elongated guide rod adapted for removable insertion in said bore, said guide rod having means for engaging the end of the conductor for guiding the same axially through said bore.

2. The tool according to claim 1 wherein said body includes a cylindrical bore portion coaxially with said frustro-conical portion adjacent its vertex, said cylindrical bore portion having a diameter substantially equal to the smallest diameter of said frustro-conical portion.

3. The tool according to claim 2 wherein the inner corner of said diametral wall and said cutting means are spaced so that the inner corner of said diametral wall is caused to contact the surface of said insulation opposite that of said cutting means.

4. The tool according to claim 3 wherein said cutting means comprises a knife blade extending continuously the entire length of the frustro-conical bore.

5. The device according to claim 4 icluding means for rotating said tool about said conductor.

6. A tool for removing insulation from an electrical conductor comprising a body having a bore extending therein, said bore comprising coaxially, a frustro-conical section and a cylindrical section of a diameter substantially equal to the smallest diameter of said conical section, a longitudinal slot formed within said body opening into said conical section, cutting means mounted in said slot for cutting said insulation on rotation of said tool and means for guiding said conductor through said tool comprising an elongated rod adapted for removable insertion in said bore, said rod having an outer diameter slightly less than said cylindrical bore section and means on one end for engaging the end of said conductor thereby rigidly guiding said cable through said bore on removal thereof.

7. The tool according to claim 6 wherein said rod is provided with an axial recess at one end adapted to encircle a denuded end of said conductor.

8. The tool according to claim 6 wherein said longitudinal slot is formed by cutting away a sector of said body defined by a diametral wall and a chordal wall perpendicular thereto and parallel to a plane tangent to the conical bore section, said cutting means being mounted on said chordal wall.

9. A tool for removing insulation from an electrical conductor comprising a body having a bore extending therethrough, said bore comprising coaxially and serially, a frustro-conical section and a cylindrical section, a longitudinal slot formed within said body and opening into said conical bore section, said slot formed by cutting away a sector of said body defined by a diametral wall and a chordal wall perpendicular thereto and parallel to a plane tangent to said conical bore, an elongated blade cutting means mounted on said chordal wall having a cutting edge parallel to said diametral wall and spaced therefrom so as to cooperate therewith in the removal of insulation from said conductor on rotation of said tool and a guide rod adapted for removable insertion into said bore having means for engagement with the end of said conductor, said guide rod holding the end of said conductor coaxial within said bore.

References Cited

UNITED STATES PATENTS

| | | | |
|---|---|---|---|
| 959,660 | 5/1910 | Walter | 145—3.7 X |
| 3,097,629 | 7/1963 | Fleming et al. | 145—3.1 |
| 3,225,629 | 12/1965 | Horrocks | 81—9.5 |

T. E. CONDON, Primary Examiner

ROSCOE V. PARKER, JR., Assistant Examiner

U.S. Cl. X.R.

145—3.1